(12) United States Patent
Seregin et al.

(10) Patent No.: US 9,648,319 B2
(45) Date of Patent: May 9, 2017

(54) DEVICE AND METHOD FOR SCALABLE CODING OF VIDEO INFORMATION BASED ON HIGH EFFICIENCY VIDEO CODING

(71) Applicant: QUALCOMM Incorporated, San Diego, CA (US)

(72) Inventors: Vadim Seregin, San Diego, CA (US); Ying Chen, San Diego, CA (US); Jianle Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 463 days.

(21) Appl. No.: 14/049,649

(22) Filed: Oct. 9, 2013

(65) Prior Publication Data

US 2014/0161179 A1    Jun. 12, 2014

Related U.S. Application Data

(60) Provisional application No. 61/767,183, filed on Feb. 20, 2013, provisional application No. 61/736,481, filed on Dec. 12, 2012.

(51) Int. Cl.
*H04N 19/33* (2014.01)
*H04N 19/30* (2014.01)
(Continued)

(52) U.S. Cl.
CPC ....... *H04N 19/00424* (2013.01); *H04N 19/30* (2014.11); *H04N 19/33* (2014.11);
(Continued)

(58) Field of Classification Search
CPC ........ H04N 19/30; H04N 19/33; H04N 19/50; H04N 19/59
See application file for complete search history.

(56) References Cited

U.S. PATENT DOCUMENTS 6,728,317 B1    4/2004  Demos
8,428,125 B2    4/2013  Oguz
(Continued)

FOREIGN PATENT DOCUMENTS

EP          0589504 A1      3/1994
WO    WO-2008049052 A2     4/2008

OTHER PUBLICATIONS

Chen J., et al., "Description of Scalable Video coding Technology Proposal by Qualcomm (Configuration 2)", 11. JCT-VC Meeting; 102. MPEG Meeting Oct. 10-Oct. 19, 2012; Shanghai; (Joint Collaborative Team on Viedo Coding of ISO/IEC JTC1/SC29/WG11 and ITU-T SG. 16) <URL: http://wftp3.itu.int/av-arch/jctvc-site/no/jvtcv-k0036>, Oct. 2, 2012 (Oct. 2, 2012), XP030112968, pp. 1-22.

(Continued)

*Primary Examiner* — Robert Hance
(74) *Attorney, Agent, or Firm* — Knobbe Martens Olson & Bear LLP

(57) ABSTRACT

An apparatus configured to code video information includes a memory unit and a processor in communication with the memory unit. The memory unit is configured to store video information associated with an enhancement layer having a first block and a base layer having a second block, the second block in the base layer corresponding to the first block in the enhancement layer. The processor is configured to predict, by inter layer prediction, the first block in the enhancement layer based on information derived from the second block in the base layer. At least a portion of the second block is located outside of a reference region of the base layer, the reference region being available for use for the inter layer prediction of the first block. The processor may encode or decode the video information.

36 Claims, 5 Drawing Sheets

(51) Int. Cl.
*H04N 19/50* (2014.01)
*H04N 19/463* (2014.01)
*H04N 19/59* (2014.01)
*H04N 19/55* (2014.01)
*H04N 19/34* (2014.01)

(52) U.S. Cl.
CPC ........... *H04N 19/463* (2014.11); *H04N 19/50* (2014.11); *H04N 19/59* (2014.11); *H04N 19/34* (2014.11); *H04N 19/55* (2014.11)

(56) References Cited

U.S. PATENT DOCUMENTS

| | | | |
|---|---|---|---|
| 2006/0153295 A1 | 7/2006 | Wang et al. | |
| 2006/0176957 A1* | 8/2006 | Han | H04N 19/52 375/240.16 |
| 2007/0189385 A1* | 8/2007 | Park | H04N 19/46 375/240.12 |
| 2008/0165850 A1* | 7/2008 | Sagetong | H04N 19/59 375/240.15 |
| 2008/0267291 A1* | 10/2008 | Vieron | H04N 19/139 375/240.16 |
| 2010/0254458 A1 | 10/2010 | Amon et al. | |
| 2012/0314767 A1 | 12/2012 | Wang et al. | |
| 2013/0003847 A1 | 1/2013 | Hong et al. | |
| 2013/0194384 A1 | 8/2013 | Hannuksela | |
| 2015/0036758 A1* | 2/2015 | Sato | H04N 19/00424 375/240.29 |

OTHER PUBLICATIONS

International Search Report and Written Opinion—PCT/US2013/093015—ISA/EPO—Mar. 19, 2014 (130978WO).

McCann, et al., "Samsung's Response to the Call for Proposals on Video Compression Technolgoy," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Sun H., et al., "Adaptive Error Concealment Algorithm for Mpeg Compressed Video," Visual Communication and Image Processing Nov. 18-20, 1992, Boston, US, Bellingham, WA, US, vol. 1818, No. PART02, Nov. 18, 1992 (Nov. 18, 1992), pp. 814-824, XP002043757.

Taiwan Search Report—TW102145970—TIPO—Oct. 16, 2015 (130978TW).

* cited by examiner

DEVICE AND METHOD FOR SCALABLE CODING OF VIDEO INFORMATION BASED ON HIGH EFFICIENCY VIDEO CODING

CROSS-REFERENCE TO RELATED APPLICATIONS

This application claims priority to U.S. Provisional No. 61/736,481, filed Dec. 12, 2012, and to U.S. Provisional No. 61/767,183, filed Feb. 20, 2013, each of which is hereby incorporated by reference in its entirety.

TECHNICAL FIELD

This disclosure relates to the field of video coding and compression, scalable coding based on high efficiency video coding (HEVC), and multiview and 3DV coding based on HEVC.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise SNR levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multiview or 3D extension of the HEVC standard, there may be multiple views, and information of one view may be utilized to code (e.g. encode or decode) the information of another view (e.g. motion estimation, motion vector prediction and/or other redundancies).

In the HEVC extension, a current block in the enhancement layer or another view may be predicted using a corresponding block in the base layer or view. For example, the syntax elements, motion information (e.g. motion vectors) or mode information (e.g. intra mode) of the current block may be based on the corresponding block in the base layer. For example, a base layer motion vector (MV) may be used as a candidate in the enhancement layer merge mode/AMVP candidate lists. A candidate list is an array of spatial and temporal motion vector predictors to be utilized by the coder to predict the current block. For example, rather than encoding and communicating the motion vector itself, a video encoder may encode and communicate a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks. However, more advanced MVP techniques may allow the video encoder to select the neighbor from which to define the MVP.

However, the corresponding block of the base layer may be located outside of the base layer frame, for example, when the coded frame size is bigger than the actual frame size that might be displayed on a device, or when the base layer is coded with another vide standard, such as AVC or MPEG2. In such situations, the information of the corresponding block cannot be used to predict the current block in the enhancement layer or view because there is no information available for the corresponding block. In other words, the portions of the enhancement layer or view that do not correspond to areas within the actual or coded frame size of the base layer picture cannot be coded using information from the base layer or view, and thus coding efficiency may be reduced. By allowing such portions of the enhancement layer or view to be predicted using the information derived from the base layer or view, the techniques described in this disclosure may improve coding efficiency and/or reduce computational complexity associated with a method of coding video data.

The systems, methods and devices of this disclosure each have several innovative aspects, no single one of which is solely responsible for the desirable attributes disclosed herein.

In one embodiment, an apparatus configured to code video information includes a memory unit and a processor in communication with the memory unit. The memory unit is configured to store video information associated with an enhancement layer having a first block and a base layer having a second block, the second block in the base layer corresponding to the first block in the enhancement layer. The processor is configured to predict, by inter layer prediction, the first block in the enhancement layer based on information derived from the second block in the base layer. At least a portion of the second block is located outside of a reference region of the base layer, the reference region being available for use for the inter layer prediction of the first block. The information derived from the second block in the base layer may include information corresponding to a neighboring block nearest to the second block. The neighboring block may be located by clipping coordinate information of the second block to a range of the reference region (e.g. both horizontally and vertically) of the base layer. Alternatively, coordinate information of the first block may first be clipped to a range of a current decoded or cropped picture of the base layer before conducting a position mapping process to determine the second block of the base layer. In a case that the second block (or a portion thereof) is determined to be outside of the reference region of the base layer, inter layer prediction of syntax elements and residual information may be disabled for the first block, or alternatively, default syntax values may be used for inter layer prediction of the first block. In another embodiment, syntax values of the neighboring block may be used for the inter layer prediction of the first block. The smallest coding unit (SCU) size of the enhancement layer may be configured to be different from the SCU of the base layer. The boundary padding size of each picture boundary of the enhancement layer may be configured to be different from the boundary padding size of each corresponding picture boundary of the base layer.

In another embodiment, a method of encoding video information includes: receiving video information associated with a base layer and an enhancement layer; and predicting, by inter layer prediction, a first block in the enhancement layer based on information derived from a second block in the base layer, the second block in the base layer corresponding to the first block in the enhancement layer; and predicting, by inter layer prediction, the first block in the enhancement layer based on information derived from the second block in the base layer. At least a portion of the second block is located outside of a reference region of the base layer, the reference region being available for use for the inter layer prediction of the first block. The information derived from the second block in the base layer may include information corresponding to a neighboring block nearest to the second block. The neighboring block may be located by clipping coordinate information of the second block to a range of the reference region (e.g. both horizontally and vertically) of the base layer. Alternatively, coordinate information of the first block may first be clipped to a range of a current decoded or cropped picture of the base layer before conducting a position mapping process to determine the second block of the base layer. In a case that the second block (or a portion thereof) is determined to be outside of the reference region of the base layer, inter layer prediction of syntax elements and residual information may be disabled for the first block, or alternatively, default syntax values may be used for inter layer prediction of the first block. In another embodiment, syntax values of the neighboring block may be used for the inter layer prediction of the first block. The smallest coding unit (SCU) size of the enhancement layer may be configured to be different from the SCU of the base layer. The boundary padding size of each picture boundary of the enhancement layer may be configured to be different from the boundary padding size of each corresponding picture boundary of the base layer.

In another embodiment, a method of decoding video information includes: receiving syntax elements extracted from an encoded video bitstream, wherein the syntax elements comprise video information associated with an enhancement layer having a first block and a base layer having a second block, the second block corresponding to the first block; and predicting, by inter layer prediction, the first block in the enhancement layer based on information derived from the second block in the base layer, wherein at least a portion of the second block is located outside of a reference region of the base layer, the reference region being available for use for the inter layer prediction of the first block. The information derived from the second block in the base layer may include information corresponding to a neighboring block nearest to the second block. The neighboring block may be located by clipping coordinate information of the second block to a range of the reference region (e.g. both horizontally and vertically) of the base layer. Alternatively, coordinate information of the first block may first be clipped to a range of a current decoded or cropped picture of the base layer before conducting a position mapping process to determine the second block of the base layer. In a case that the second block (or a portion thereof) is determined to be outside of the reference region of the base layer, inter layer prediction of syntax elements and residual information may be disabled for the first block, or alternatively, default syntax values may be used for inter layer prediction of the first block. In another embodiment, syntax values of the neighboring block may be used for the inter layer prediction of the first block. The smallest coding unit (SCU) size of the enhancement layer may be configured to be different from the SCU of the base layer. The boundary padding size of each picture boundary of the enhancement layer may be configured to be different from the boundary padding size of each corresponding picture boundary of the base layer.

In another embodiment, a non-transitory computer readable medium includes code that, when executed, causes an apparatus to: store video information associated with an enhancement layer having a first block and a base layer having a second block, the second block corresponding to the first block; and predict, by inter layer prediction, the first block in the enhancement layer based on information derived from the second block in the base layer, wherein at least a portion of the second block is located outside of a reference region of the base layer, the reference region being available for use for the inter layer prediction of the first block.

In another embodiment, a video coding device configured to code video information includes: means for storing video information associated with an enhancement layer having a first block and a base layer having a second block, the second block corresponding to the first block; and means for predicting, by inter layer prediction, the first block in the enhancement layer based on information derived from the second block in the base layer, wherein at least a portion of the second block is located outside of a reference region of the base layer, the reference region being available for use for the inter layer prediction of the first block.

DETAILED DESCRIPTION

Figure 1:
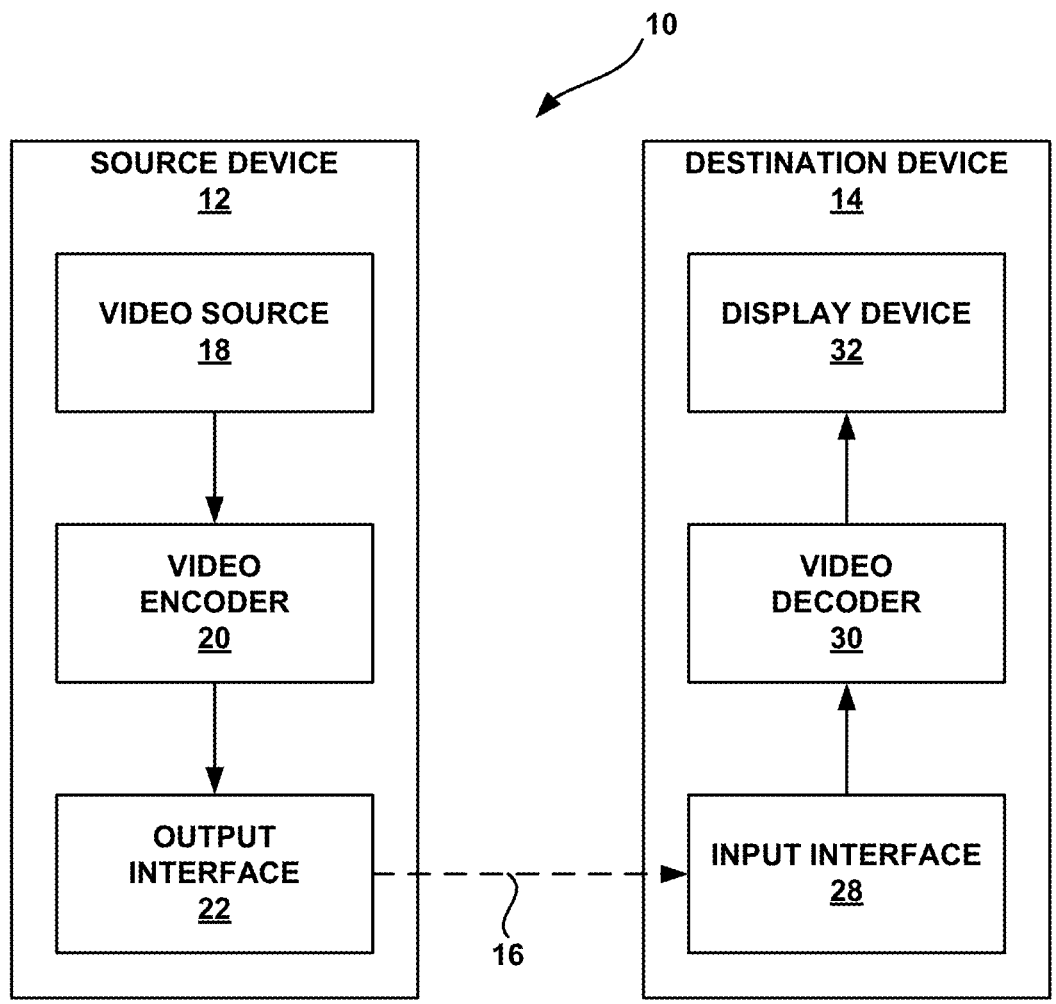
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, i.e., Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

Video Coding Standards

A digital image, such as a video image, a TV image, a still image or an image generated by a video recorder or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, IS O/IEC MPEG-1 Visual, ITU-T H.262 or ISO/IEC MPEG-2 Visual, ITU-T H.263, ISO/IEC MPEG-4 Visual and ITU-T H.264 (also known as IS O/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/do-c_end_user/documents/12_Geneva/wg11/JCTVC-L1003-v34.zip, as of Aug. 9, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and IS O/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
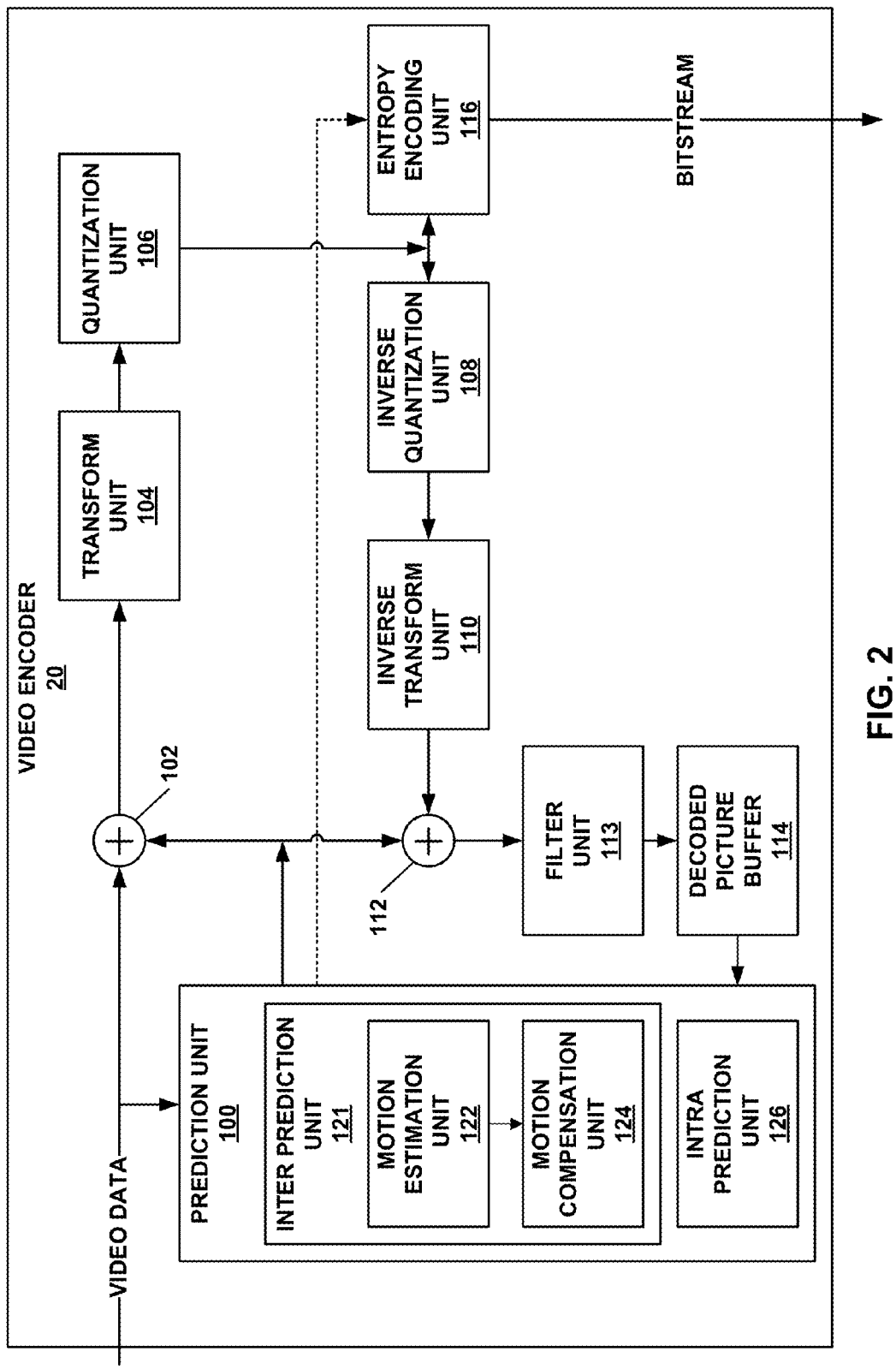
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, motion estimation unit 122, a motion compensation unit 124, and an intra prediction unit 126. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (i.e., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

As further discussed below with reference to FIG. 5, the prediction unit 100 (e.g. via the inter prediction unit 121) may be configured to predict a current block in the EL having an unavailable corresponding block in the BL by performing the steps illustrated in FIG. 5.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, i.e., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

After prediction unit 100 selects the prediction data for PUs of a CU, residual generation unit 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
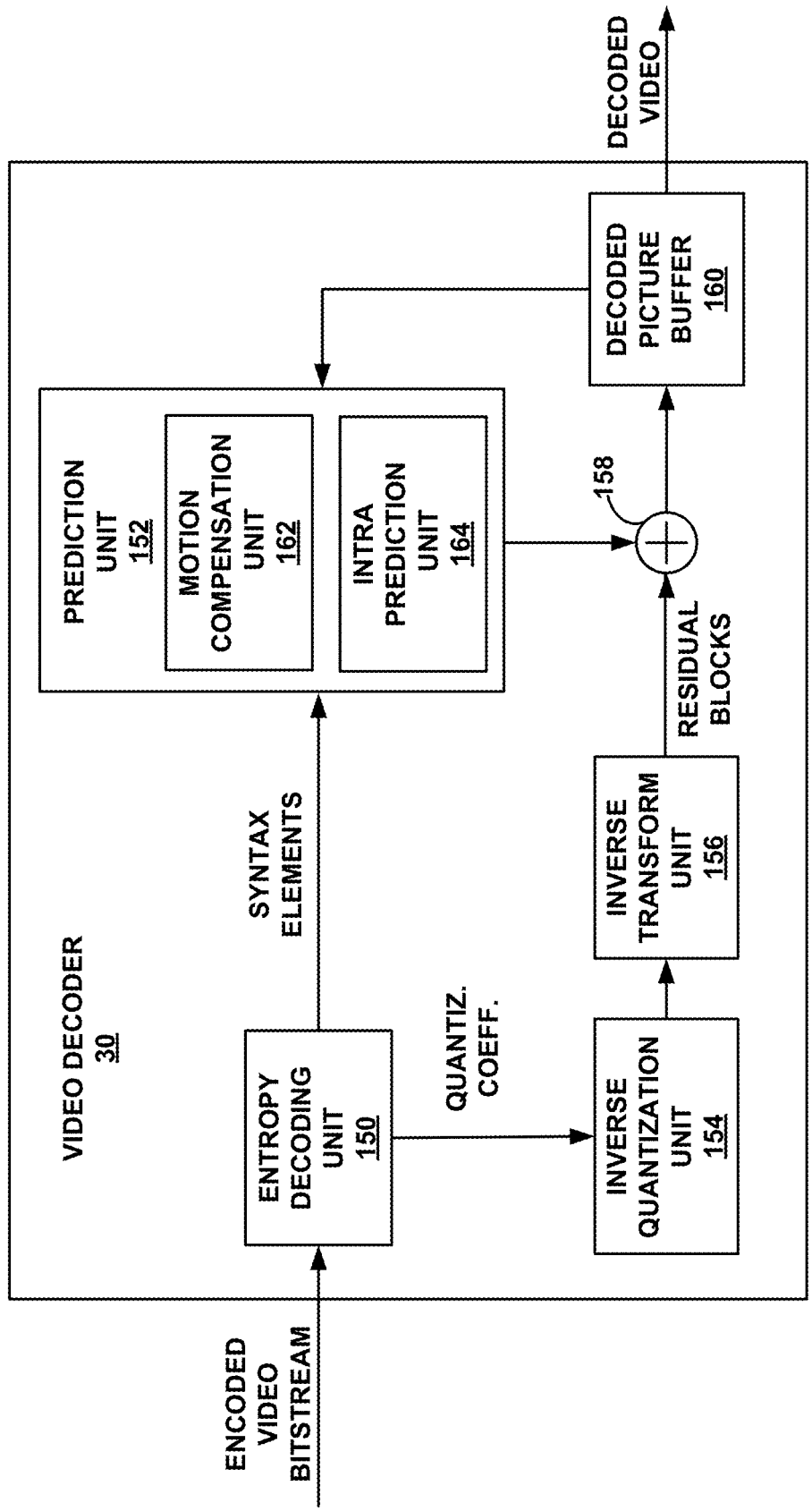
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, and an intra prediction unit 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, i.e., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As further discussed below with reference to FIG. 5, the prediction unit 152 may be configured to predict a current block in the EL having an unavailable corresponding block in the BL by performing the steps illustrated in FIG. 5.

Reconstruction unit 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

In an embodiment of the HEVC extension, the enhancement layer or another view syntax such as motion field or intra modes can be predicted using the corresponding block of the base layer. For example, a base layer motion vector (MV) can be used as a candidate in the enhancement layer merge mode/AMVP (Advanced Motion Vector Prediction) candidate lists. However, there may be a situation when a corresponding or collocated block of the base layer is located outside of the base layer frame. This may happen when the coded frame size is bigger than the actual frame size that might be displayed on a device.

Figure 4:
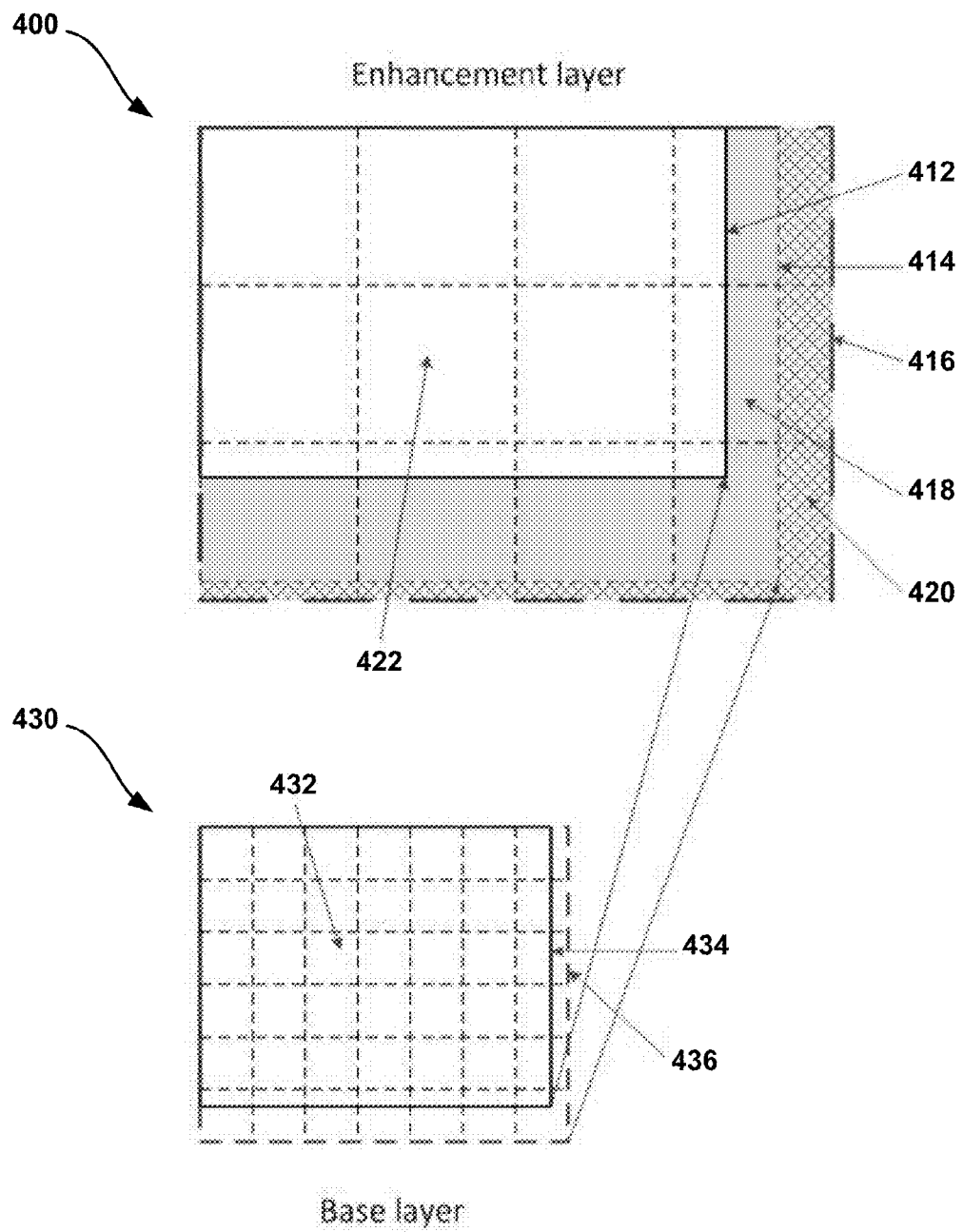
FIG. 4 is a diagram illustrating the various frames in the base layer and the enhancement layer.

For example, such a situation may happen when the boundary padding size of the enhancement picture is larger than that of the base layer picture. The different boundary padding size of the base and enhancement layers could be introduced by the specific encoder setting. It may also be due to different smallest coding unit (SCU) sizes of the base and enhancement layers. Since in HEVC the actual coded frame size is aligned with the SCU size (a frame size is an integer multiple of SCUs), if the SCU of the enhancement layer is bigger than the SCU of the base layer, there is no syntax information for some parts of the base layer frame. As shown in FIG. 4, the different sizes of the enhancement layer SCU 422 and the base layer SCU 432 may result in a portion of the enhancement layer 400 not having a corresponding region in the base layer 430 from which motion information or pixel information may be retrieved for inter layer prediction. In another example, the unavailability of base layer information may occur when the base layer is coded with another video standard (e.g. AVC or MPEG2).

In 3D-HEVC, when applying a disparity vector to a boundary block to locate a block in the reference view, the corresponding block may fall outside the boundary of the view component of the reference view.

This disclosure is generally directed to SVC extension. This disclosure is also valid for Multiview Video Coding (MVC) where one of the views serves as an enhancement layer in the description.

FIG. 4 illustrates the various frames of the enhancement layer 400 and the base layer 430. The white rectangle 432 represents the actual frame size of the base layer picture (e.g. cropped to fit a display size of a device). The coded frame size of the base layer is shown in broken lines 436 at the bottom of FIG. 4, and the coded frame size of the enhancement layer is shown in broken lines 416 at the top of FIG. 4. Also shown between the actual frame size 412 and the coded frame size 416 of the enhancement layer in broken lines 414 is a coded frame size of the upsampled base layer. The area 418 represents the area between the actual frame size and the coded frame size of the upsampled base layer, and the area 420 represents the area between the coded frame size of the upsampled base layer and the coded frame size of the enhancement layer.

Typically, for inter-layer prediction, the base layer information, including motion vector (MV) and other syntax elements, can be obtained from the corresponding sub-block or pixel location and used to predict the current block (e.g. in the enhancement layer. This corresponding sub-block or pixel location may be located inside or outside of the current enhancement layer CU or PU. For example, the sub-block or pixel location may be a center or corner sub-block or pixel location. If this corresponding sub-block or pixel location is located in an unavailable area outside of the base layer frame, it is desirable to define the behavior of the SVC or MVC codec for this case. For example, the "corresponding block" (or sub-block or pixel location) used herein may refer to a co-located block, a neighboring block, or any other block determined by the coder (e.g. encoder or decoder).

As mentioned above, there may be regions of the enhancement layer that do not have corresponding regions in the base layer available for inter-layer prediction. For example, the bottom and right edges of the coded frame of the enhancement layer (i.e. the area 420 in FIG. 4) have no corresponding regions in the base layer from which motion information may be obtained for use in the inter layer prediction. Thus, such edge portions cannot be coded with information obtained from their corresponding portions in the base layer, and thus conventional inter layer prediction techniques cannot be used.

Unavailability of Reference Block in BL

Whether the corresponding sub-block or pixel location is outside of the base layer frame can be checked by comparing the coordinates of the sub-block corners or pixel location with the frame size. For example, if the coordinates of the right-bottom corner of the sub-block is out of the range of the frame size of the base layer (or the frame size of the BL upsampled according to the spatial ratio of the BL and the EL), the corresponding sub-block is considered unavailable for predicting the current block in the EL. One or more of the techniques discussed herein may be used to perform inter layer prediction on such blocks having unavailable corresponding blocks in the BL (e.g. unavailable BL syntax).

In one embodiment, during an inter-view/layer motion prediction, top-left and bottom-right positions $P_0$ and $P_1$ of the current block in the EL, which correspond to the locations $Q_0$ and $Q_1$ in the reference/base view/layer, are identified. If $Q_0$ or $Q_1$ is outside the picture of the reference/base view/layer, the corresponding block is considered to be unavailable, and it is not used for inter-layer/view motion prediction. In such a case, inter-layer/view prediction of other syntax elements or residual information may be disabled. In another embodiment, the base layer/reference view block may be considered to be unavailable only when both $Q_0$ and $Q_1$ are outside the picture of the reference/base view/layer.

In yet another embodiment, instead of the top-left and bottom-right positions of the current block in the EL, the current block is identified by top-right and bottom-left positions of the block, and thus the availability of the reference block in the BL is determined based on the mapped positions of the top-right and bottom-left positions.

In yet another embodiment, the current block may be identified by the horizontal coordinates of the leftmost pixels and rightmost pixels of the block, $X_l$ and $X_r$, and the vertical coordinates of the topmost pixels and bottommost pixels, $Y_l$ and $Y_r$. After the mapping of such coordinates to corresponding coordinates in the base/reference layer/view, if either of the values (e.g. horizontal coordinates and vertical coordinates) is beyond the picture boundary, the corresponding block in the base layer/reference view is considered to be unavailable. Here, the picture boundary may refer to the boundary of the actual frame or the coded frame, as illustrated in FIG. 4.

For a certain syntax element (or all syntax elements), the mapped position in the base layer/reference view of the current block may be dependent on the mapped position of a specific coordinate of the current block. When the mapped position of the specific coordinate of the current block is beyond the base/reference layer/view boundary, the base layer/reference view block is considered to be unavailable. The specific coordinate of a block could point to the top-left, bottom-right, central, top-right, bottom-left position of the block. The specific coordinate of a block could be the same position for all syntax elements, or it might be different positions for different syntax elements.

Reference Region

Even when a mapped position in the base layer/reference view is within the picture of the base layer/reference view, if it is outside the reference region of the base layer/reference view, it is considered to reside in an unavailable region, and the block identified by such a position is considered to be unavailable. In one embodiment, the reference region is defined as the rectangular region within the picture of the base layer/reference view, from which the current layer/view is predicted (e.g. available for use for inter layer or inter view prediction). Information from pixels or blocks of the picture outside the reference region is not used for inter-layer/view prediction. The "picture" of the base layer/reference view used herein may refer to a picture of the base layer cropped for display, which is illustrated by the white rectangle 434 at the bottom of FIG. 4. Alternatively, the term may refer to the coded (e.g. decoded) picture of the base layer, which is illustrated with broke lines 436 at the bottom of FIG. 4.

Locating the Nearest Available Block

In one embodiment, when a block or pixel location is mapped to an unavailable block of the base/reference layer/view or identified to be outside the left/right and/or top/bottom boundary of the reference region, information of an the nearest available block to the right/left and/or bottom/top boundary of the unavailable reference block (i.e. corresponding block) may be used for inter-layer/view prediction. One way of locating such nearest available block is by clipping the coordinates of the corresponding base/reference layer/view location into the range of the reference region size of the base layer/reference, where the reference region can be the decoded base layer picture (436) or the cropped base layer picture (434), as depicted in FIG. 4. However, the reference region is not limited to those depicted in FIG. 4, and can be region specified by the coder for the enhancement layer or the specific block in the enhancement layer.

For example, the horizontal coordinates of the corresponding base/reference layer/view location may be clipped to the range between 0 and (reference_region_width−1), and the vertical coordinates of the corresponding base/reference layer/view location may be clipped to the range between 0 and (reference_region_height−1). By clipping the coordinates of the corresponding base/reference layer/view location, the nearest available reference block is located, and the information corresponding to such block (e.g. pixel information or motion information) can be used to predict the current block in the enhancement layer.

Figure 5:
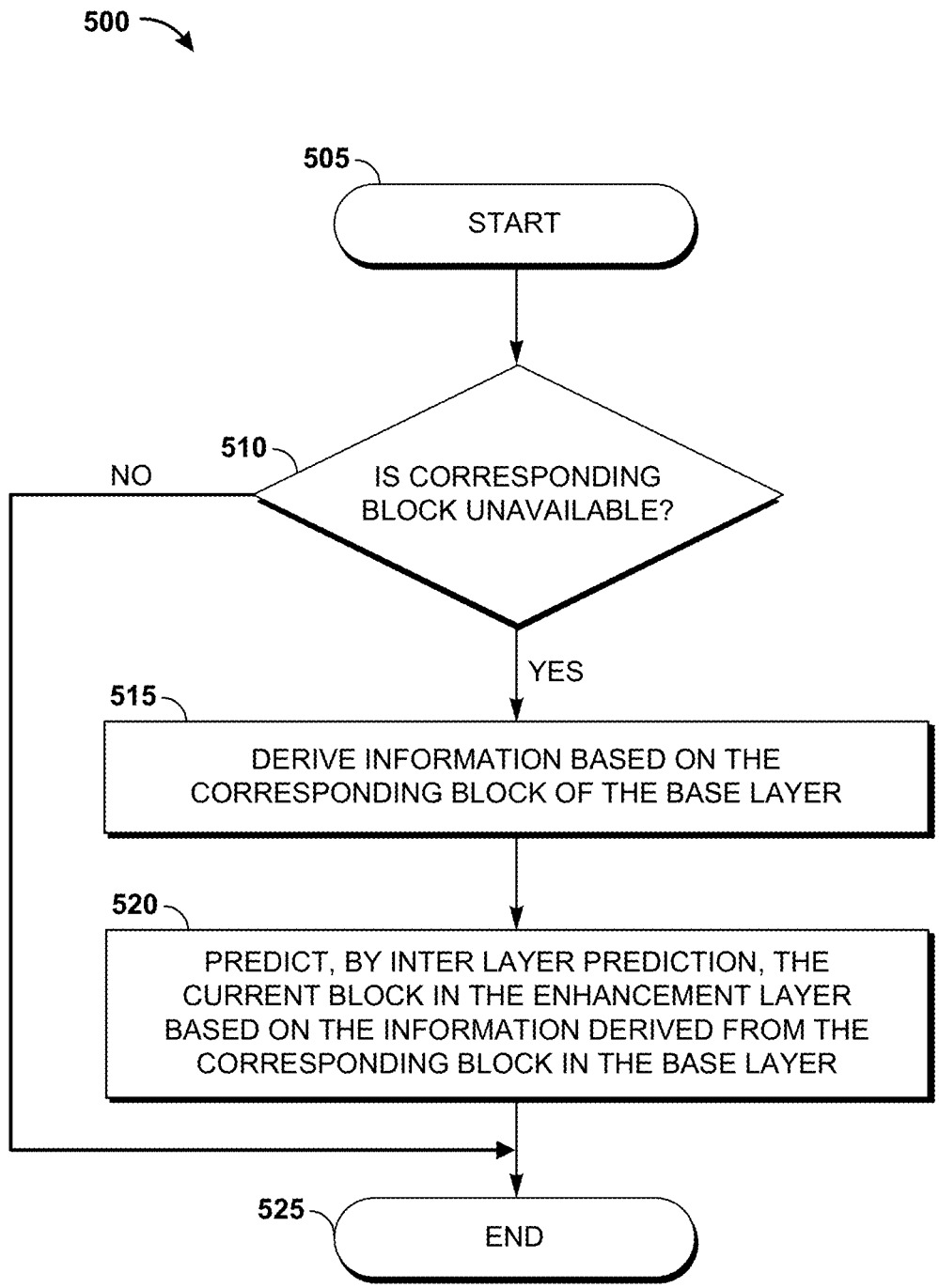
FIG. 5 is a flow chart illustrating a method of coding video information, according to one embodiment of the present disclosure.

FIG. 5 illustrates an example method 500 for coding video information, according to one embodiment of the present disclosure. The method 500 can be performed by one or more components of video encoder 20 or video decoder 30, including, but not limited to, inter prediction unit 121, motion compensation unit 162. In some embodiments, other components may be used to implement one or more of the steps described herein. For example, the method 500 can be used to perform one or more of the actions described with respect to FIG. 4. Although the steps of the method 500 are described as being performed by a coder, such steps may be performed by an encoder (e.g. video encoder 20) or a decoder (e.g. video decoder 30).

The method 500 is started at step 505, for example, for coding a current block in the enhancement layer. At step 510, the coder checks whether a corresponding block is unavailable. For example, the corresponding block may be a co-located block of the current block in the enhancement layer, a neighboring block of the co-located block, or any other block determined by the coder. Any of the various availability-checking techniques described herein may be used to determine whether such corresponding block is unavailable. If it is determined that the corresponding block is unavailable (YES at step 510), the coder derives information based on the corresponding block of the base layer (step 515). For example, as discussed herein, a neighboring block may be located by the coder and information associated with the neighboring block may be derived for use in the inter layer prediction. Based on the derived information, inter layer prediction is performed to predict the current block in the enhancement layer (step 520). For example, as discussed above, the prediction unit 100 of the video encoder 20 of FIG. 2 or the prediction unit 152 of the video decoder 30 of FIG. 2 may perform such prediction. The method 500 is ended at step 525.

Syntax Elements and Residual Information

In one embodiment, if a block is mapped to an unavailable block of the base/reference layer/view or identified to be outside the left/right and/or top/bottom boundary of the reference region, inter layer prediction for syntax elements and/or residual information is disabled for such block. Alternatively, instead of disabling inter layer prediction for such block, default syntax values may be used for inter layer prediction. For example, a zero motion field (e.g., a MV is equal to zero and reference index is equal to zero) may be used, and intra mode may be set to DC prediction direction.

In another embodiment, the syntax elements of a neighboring available block may be substituted for the syntax elements of the unavailable corresponding block. In the case of using the information of the neighboring available block, the motion field used for the unavailable sub-blocks may be compressed (e.g. based on 16×16 size like in HEVC), especially if the base layer frame is inserted into the reference picture list.

Smallest Coding Unit (SCU) Size

The SCU size of the enhancement and base layer may be restricted to avoid unavailable regions for the inter-layer syntax prediction. For example, the SCU size of the enhancement layer may be configured to be smaller than or equal to the SCU size of the base layer. In addition, the spatial scalability aspect ratio may be taken into account in defining the restriction on the SCU sizes.

Picture Boundary Padding Size

The picture boundary padding sizes of the enhancement layer and the base layer may be restricted to avoid unavailable regions for the inter-layer syntax prediction. For example, the padding size of the enhancement layer may be configured to be smaller than or equal to the padding size of the base layer. More specifically, the padding sizes of each picture boundary (i.e. left, top, right and bottom boundary in the enhancement layer picture) may be made smaller than or equal to those in the base layer picture. In addition, the resolution ratio can be taken into account in defining the restriction on the picture boundary padding sizes for the spatial scalability case.

Availability of Motion Field Information

During inter-view/layer motion prediction, if the bottom right corner of the enhancement layer block is outside of the picture, the motion field is considered to be unavailable. The picture as used herein may refer to the decoded base layer picture or the cropped base layer picture, as illustrated in FIG. 4. In such a case, the motion field may be considered to be unavailable even if the corresponding base layer block is inside the base layer picture. Alternatively, in another embodiment, if the representative part of the enhancement layer block is outside of the picture, but the base layer block corresponding to the representative part of the enhancement layer block is inside the base layer picture, then the motion field from the base layer block (scaled according to the scalability ratio if necessary) may be assigned for the enhancement layer block.

Availability of Motion Field Information

In another embodiment, instead of the bottom right corner of the block, other points or any sub-block inside the block can be used as the representative point. For example, the center point of the base layer or enhancement layer block, or one of the center's 4×4 sub-blocks of the base or enhancement layer block may be used. If this representative point or sub-block is outside of the corresponding BL or EL picture, one of the techniques described in the present disclosure may be applied. The picture here may be a decoded picture or a cropped picture.

Clipping Coordinates Before Position Mapping

In one embodiment, a range restriction may be applied to the location in the current enhancement layer picture before conducting the position mapping process to determine the location of the corresponding block in the base/reference layer/view. For example, the coordinates of the current location may be clipped into the picture size range of the current decoded picture before conducting the position mapping process to obtain the corresponding location in the base/reference layer/view. In another example, the coordinates of the current location may be clipped into the picture size range of the current cropped picture before conducting the position mapping process to obtain corresponding location in the base/reference layer/view.

Cropped Picture and Decoded Picture

In a more detailed view, the region outside of the frame can be divided in two parts: the first part (e.g. area 418 in FIG. 4) which is related to an extended part of the base layer frame due to alignment with the size of the base layer SCU 432 shown in FIG. 4, and the second part (e.g. area 420 in FIG. 4) that does not have any corresponding part in the base layer frame, shown with the hatching on FIG. 4.

The techniques described above may be applied to both areas 418 and 420. Alternatively, the area 418 may be considered to be available, since the information can be obtained from the extended base layer frame (i.e. coded frame 436 of the base layer), and thus, the techniques described in this disclosure may only be applied to the area 420.

In one embodiment, the unavailability of a block can be checked directly according to the mapped location in the base/reference layer/view picture. As shown in FIG. 4, one technique that may be used is to consider any mapped position within the actual frame size of the base/reference layer/view picture to be available and the part beyond the actual frame size to be unavailable. Alternatively, any mapped position within the coded frame size of the base/reference layer/view picture may be considered to be available, and the part beyond the coded frame size may be considered to be unavailable.

Other Applications

In the above description, although motion inter-layer prediction was used as an example, the same principles and techniques are also applicable to other syntax elements such as intra mode, prediction mode, split flag, skip flag and so on.

Alternatively or additionally, the methods mentioned above can be applied to inter-layer pixel prediction (including Intra-BL or Texture-BL prediction, inter-layer residue prediction, difference domain intra prediction, difference domain inter prediction, etc.). For example, for those blocks or part of the blocks that are located in an unavailable region, the inter-layer pixel prediction can be disabled, or the pixels can be initialized with default values, for example, 0 or (1<<(bitdepth−1)), where bitdepth can be 8, 10, 12 bits and so on.

Alternatively, pixels can be padded using neighboring available pixels. The pixels padding method, for example, can be the same method that is used for pixel padding for interpolation. However, the number of pixels that are required to be extended may be different from those needed for interpolation purpose. Other pixel padding methods are also applicable without restriction.

For the inter-layer pixel prediction case, the above mentioned unavailability checking method can be done on a pixel-by-pixel basis. That is, for each pixel, its collocated position in the base/reference layer/view picture is used to check the availability with the above mentioned rule. When a pixel is mapped to an unavailable position of the base/reference layer/view, the pixel of the nearest available position to the right/left and/or bottom/top boundary of the mapped position is used for inter-layer/view prediction.

As shown in FIG. 4, the top left corner with coordinates (0,0) is aligned for the base and enhancement layers. However, the solution can be applied in a situation where no such corner alignment is present. In such a situation, there is another unavailable area outside of the enhancement layer frame from the left and top sides similar to the right and bottom counterparts shown on FIG. 4.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, units, modules, circuits, and algorithm steps described in connection with the embodiments disclosed herein may be implemented as electronic hardware, computer software, or combinations of both. To clearly illustrate this interchangeability of hardware and software, various illustrative components, blocks, units, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as units, modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, comprising:
   a memory configured to store video data associated with an enhancement layer and a base layer, the enhancement layer having a current block; and
   a processor in communication with the memory, the processor configured to:
      obtain a cropped base layer picture of the base layer, wherein the cropped base layer picture comprises a cropped portion of a coded base layer picture of the base layer, the coded base layer picture having a base layer block corresponding to the current block, wherein at least a portion of the base layer block is outside the cropped base layer picture, wherein the portion of the base layer block that is outside the cropped portion is not available to the processor to code the current block; and
      code the current block based on the cropped base layer picture and not based on the portion of the base layer block that is outside the cropped portion.

2. The apparatus of claim 1, wherein the processor is further configured to:

code the current block based on information derived from a neighboring block nearest to the base layer block in the base layer, the neighboring block being located within the cropped base layer picture.

3. The apparatus of claim 1, wherein the processor is further configured to clip coordinate information of the base layer block to a range of the cropped base layer picture.

4. The apparatus of claim 1, wherein the processor is further configured to clip coordinate information of the current block to a range of the cropped base layer picture prior to a position mapping process to determine base layer block to be used to code the current block.

5. The apparatus of claim 1, wherein the processor is further configured to:
pad the cropped base layer picture such that the padded cropped base layer picture has a same size as the coded base layer picture;
upsample the padded cropped base layer picture such that the upsampled padded cropped base layer picture has a same size as an enhancement layer picture containing the current block; and
code the current block based on the upsampled padded cropped base layer picture.

6. The apparatus of claim 1, wherein the processor is further configured to:
determine whether the base layer block is outside the cropped base layer picture; and
in response to a determination that the base layer block is outside the cropped base layer picture, disable inter layer prediction of syntax elements and residual information for the current block.

7. The apparatus of claim 1, wherein the processor is further configured to:
determine whether the base layer block is outside the cropped base layer picture; and
in response to a determination that the base layer block is outside the cropped base layer picture, use default syntax elements for the inter layer prediction of the current block.

8. The apparatus of claim 2, wherein the processor is further configured to:
determine whether the base layer block is outside the cropped base layer picture; and
in response to a determination that the base layer block is outside the cropped base layer picture, use syntax elements of the neighboring block for the inter layer prediction of the current block.

9. The apparatus of claim 1, wherein a smallest coding unit (SCU) size of the enhancement layer is different from a SCU size of the base layer.

10. The apparatus of claim 1, wherein a boundary padding size of each picture boundary of the enhancement layer is different from a boundary padding size of each corresponding picture boundary of the base layer.

11. A method of encoding video information, the method comprising:
obtaining a cropped base layer picture of a base layer, wherein the cropped base layer picture comprises a cropped portion of a coded base layer picture of the base layer, the coded base layer picture having a base layer block corresponding to a current block in an enhancement layer, wherein at least a portion of the base layer block is outside the cropped base layer picture, wherein the portion of the base layer block that is outside the cropped portion is unavailable to encode the current block; and encoding the current block based on the cropped base layer picture and not based on the portion of the base layer block that is outside the cropped portion.

12. The method of claim 11, further comprising:
encoding the current block based on information derived from a neighboring block nearest to the base layer block in the base layer, the neighboring block being located within the cropped base layer picture.

13. The method of claim 11, further comprising:
clipping coordinate information of the base layer block to a range of the cropped base layer picture.

14. The method of claim 11, further comprising:
clipping coordinate information of the current block to a range of the cropped base layer picture; and
conducting, based on the clipped coordinate information of the current block, a position mapping process to determine base layer block to be used to encode the current block.

15. The method of claim 11, further comprising:
padding the cropped base layer picture such that the padded cropped base layer picture has a same size as the coded base layer picture;
upsampling the padded cropped base layer picture such that the upsampled padded cropped base layer picture has a same size as an enhancement layer picture containing the current block; and
encoding the current block based on the upsampled padded cropped base layer picture.

16. The method of claim 11, further comprising:
determining whether the base layer block is outside the cropped base layer picture; and
in response to determining that the base layer block is outside the cropped base layer picture, disabling inter layer prediction of syntax elements and residual information for the current block.

17. The method of claim 11, further comprising:
determining whether the base layer block is outside the cropped base layer picture; and
in response to determining that the base layer block is outside the cropped base layer picture, using default syntax elements for the inter layer prediction of the current block.

18. The method of claim 12, further comprising:
determining whether the base layer block is outside the cropped base layer picture; and
in response to determining that the base layer block is outside the cropped base layer picture, using syntax elements of the neighboring block for the inter layer prediction of the current block.

19. The method of claim 11, wherein a smallest coding unit (SCU) size of the enhancement layer is different from a SCU size of the base layer.

20. The method of claim 11, wherein a boundary padding size of each picture boundary of the enhancement layer is different from a boundary padding size of each corresponding picture boundary of the base layer.

21. A method of decoding video information, the method comprising:
receiving syntax elements extracted from an encoded video bitstream, wherein the syntax elements comprise video data associated with an enhancement layer and a base layer, the enhancement layer having a current block; and
obtaining a cropped base layer picture of the base layer, wherein the cropped base layer picture comprises a cropped portion of a coded base layer picture of the base layer, the coded base layer picture having a base layer block corresponding to the current block, wherein at least a portion of the base layer block is outside the cropped base layer picture, wherein the portion of the base layer block that is outside the cropped portion is not available to encode the current block; and decoding the current block of the enhancement layer based on the cropped base layer picture and not based on the portion of the base layer block that is outside the cropped portion.

22. The method of claim 21, further comprising:

decoding the current block based on information derived from a neighboring block nearest to the base layer block, the neighboring block being located within the cropped base layer picture.

23. The method of claim 21, further comprising:

clipping coordinate information of the base layer block to a range of the cropped base layer picture.

24. The method of claim 21, further comprising:

clipping coordinate information of the current block to a range of the cropped base layer picture; and conducting, based on the clipped coordinate information of the current block, a position mapping process to determine the base layer block to be used to decode the current block.

25. The method of claim 21, further comprising:

padding the cropped base layer picture such that the padded cropped base layer picture has a same size as the coded base layer picture;

upsampling the padded cropped base layer picture such that the upsampled padded cropped base layer picture has a same size as an enhancement layer picture containing the current block; and decoding the current block based on the upsampled padded cropped base layer picture.

26. The method of claim 21, further comprising:

determining whether the base layer block is outside the cropped base layer picture; and in response to determining that the base layer block is outside the cropped base layer picture, disabling inter layer prediction of syntax elements and residual information for the current block.

27. The method of claim 21, further comprising:

determining whether the base layer block is outside the cropped base layer picture; and in response to determining that the base layer block is outside the cropped base layer picture, using default syntax elements for the inter layer prediction of the current block.

28. The method of claim 22, further comprising:

determining whether the base layer block is outside the cropped base layer picture; and in response to determining that the base layer block is outside the cropped base layer picture, using syntax elements of the neighboring block for the inter layer prediction of the current block.

29. The method of claim 21, wherein a smallest coding unit (SCU) size of the enhancement layer is different from a SCU size of the base layer.

30. The method of claim 21, wherein a boundary padding size of each picture boundary of the enhancement layer is different from a boundary padding size of each corresponding picture boundary of the base layer.

31. A non-transitory computer readable medium comprising code that, when executed, causes an apparatus to:

store video data associated with an enhancement layer and a base layer, the enhancement layer having a current block; and obtain a cropped base layer picture of the base layer, wherein the cropped base layer picture comprises a cropped portion of a coded base layer picture of the base layer, the coded base layer picture having a base layer block corresponding to the current block, wherein at least a portion of the base layer block is outside the cropped base layer picture, wherein the portion of the base layer block that is outside the cropped portion is not available to encode the current block; and code the current block based on the cropped base layer picture and not based on the portion of the base layer block that is outside the cropped portion.

32. The medium of claim 31, wherein the code further causes the apparatus to:

code the current block based on information derived from a neighboring block nearest to the base layer block, the neighboring block being located within the cropped base layer picture.

33. The medium of claim 31, wherein the code further causes the apparatus to:

clip coordinate information of the base layer block to a range of the cropped base layer picture.

34. A video coding device configured to code video information, the video coding device comprising:

means for storing video data associated with an enhancement layer and a base layer, the enhancement layer having a current block; and means for obtaining a cropped base layer picture of the base layer, wherein the cropped base layer picture comprises a cropped portion of a coded base layer picture of the base layer, the coded base layer picture having a base layer block corresponding to the current block, wherein, at least a portion of the base layer block is outside the cropped base layer picture, wherein the portion of the base layer block that is outside the cropped portion is not available to encode the current block; and means for coding the current block based on the cropped base layer picture and not based on the portion of the base layer block that is outside the cropped portion.

35. The device of claim 34, wherein said means for coding the current block is configured to code the current block based on information derived from a neighboring block nearest to the base layer block, the neighboring block being located within the cropped base layer picture.

36. The device of claim 34, further comprising:

means for clipping coordinate information of the base layer block to a range of the cropped base layer picture.

* * * * *